April 29, 1947.                L. HIMMEL                2,419,551
                            GLIDE PATH SYSTEM
              Filed May 1, 1944              2 Sheets-Sheet 1
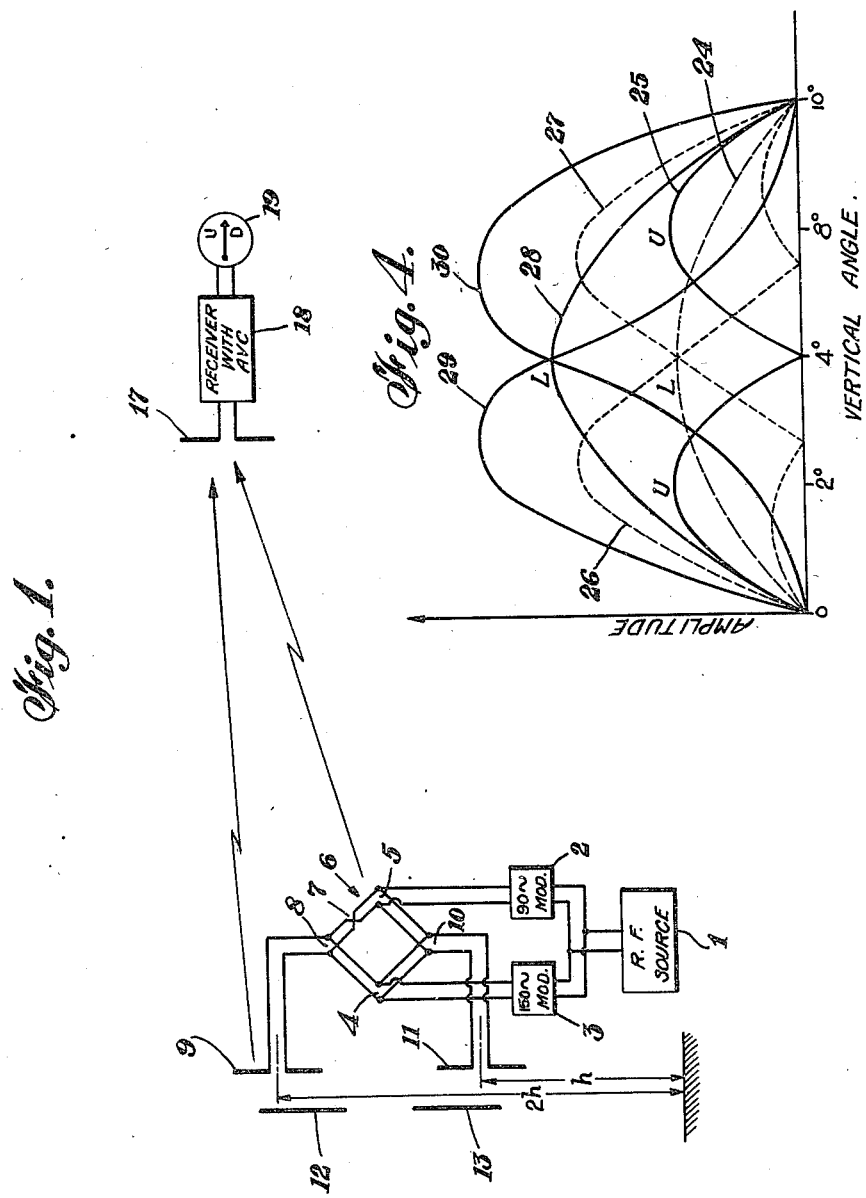
INVENTOR.
LEON HIMMEL
BY
R P Morris
ATTORNEY April 29, 1947.                L. HIMMEL                 2,419,551
                             GLIDE PATH SYSTEM
                           Filed May 1, 1944         2 Sheets-Sheet 2
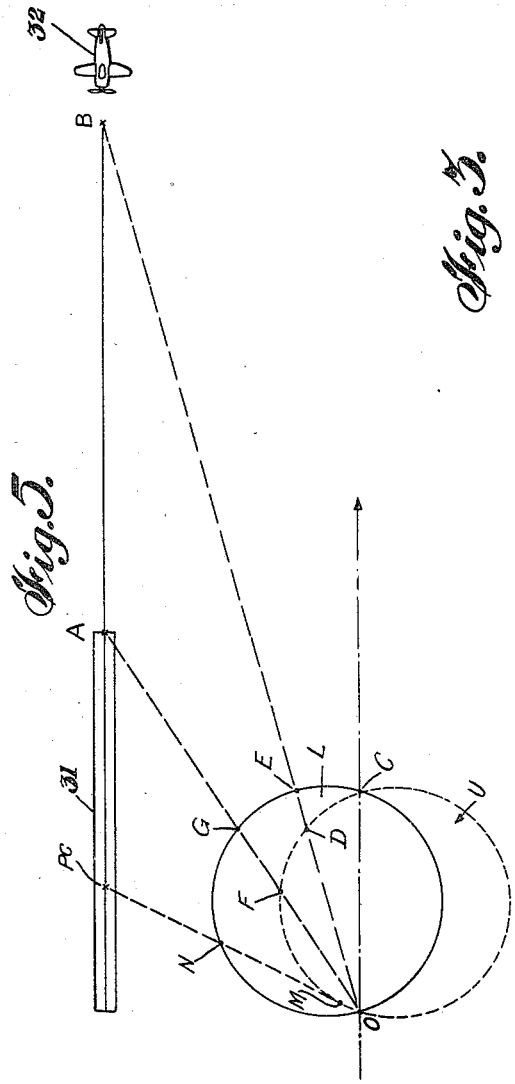
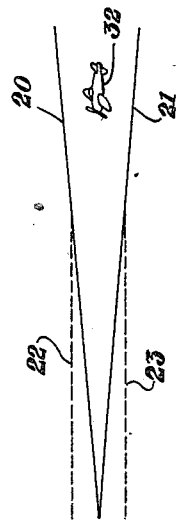
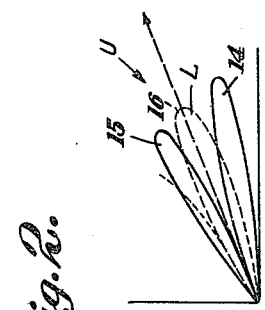
INVENTOR.
LEON HIMMEL
BY
ATTORNEY Patented Apr. 29, 1947

2,419,551

UNITED STATES PATENT OFFICE 2,419,551

GLIDE PATH SYSTEM

Leon Himmel, New York, N. Y., assignor to Federal Telephone and Radio Corporation, New York, N. Y., a corporation of Delaware Application May 1, 1944, Serial No. 533,472

6 Claims. (Cl. 250—11)

1

This invention relates to radio beacons, and more particularly to radio beacons used for guiding aircraft to a landing at an airport.

In previously proposed equi-signal glide path beacons, it has been found that when the beacon path is made sharp, the receiver becomes too sensitive to departures from course at points near the ground. As a consequence, as the pilot approaches a landing, he tends to over-correct for small departures from course. In order to partially overcome this difficulty, automatic volume control has been applied to the glide beacon receiver, tending to reduce the sensitivity of the receiver as the aircraft approaches the point of contact of the landing field. However, even this automatic volume control has not been found sufficient to overcome the tendency of effective sharpening of the course at points near the landing runway where the energy level is very high.

It is an object of my invention to provide an improved form of radio glide path beacon wherein the indications of the receiver are rendered less sharp at points approaching the point of contact of the aircraft to the runway than in previously known systems.

It is a further object of my invention to provide a method whereby the glide path defined by an equi-signal radio beacon may be given the desired degree of sharpness at remote points and still preserve sufficient breadth at the landing point to prevent over-compensation by the pilot in flight.

It is a still further object of my invention to provide a glide path beacon in cooperation with an automatic glide path receiver, wherein the relative amplitude of two glide path signals is reduced in the area adjacent the landing runway.

In accordance with a feature of my invention, I provide, in a system using vertically spaced radiating antennas to define a glide path beacon, a system wherein the relative amplitude of the energy received from the two antennas varies with respect to one another as the craft approaches the landing point on the runway. This may be accomplished by the use of directive radiation patterns for the upper and lower radiators of the equi-signal system. Preferably, the radiator carrying both side bands and carrier frequency, generally the lower antenna, is adjusted so that the directive action thereof is stronger as the aircraft approaches the landing runway relative to the energy from the other radiator transmitting side band frequencies only. The beacon is displaced to one side of the runway so that the effective angle from the craft to the radiation center

2 changes as the craft nears the landing point. This change in relative signal level reduces effectively the sharpness in the signal indications produced in the receiver as the aircraft approaches a landing.

With the above objects in view, a better understanding of my invention and the objects and features thereof may be had by reference to the specific description made with reference to the accompanying drawing, in which:

Fig. 1 is a simple block wiring diagram of a radio beacon system in accordance with my invention;

Fig. 2 is an elevational diagram of radio beacon patterns produced by the transmitter of Fig. 1;

Fig. 3 is a diagram illustrating the effect of the sharp radio beacon on an aircraft approaching a landing;

Fig. 4 is a diagram illustrating the effect of relative change in amplitude of radiated signals from upper and lower antennas of a radio beacon; and Fig. 5 is a diagram in horizontal plan illustrating the horizontal distribution of the beacon radiators in accordance with my invention with respect to a landing runway.

Turning first to Fig. 1, energy from a radio frequency source 1 is fed to a pair of modulators 2 and 3 supplied with energy at 90 and 150 cycles, respectively. Other frequencies may be used, if desired, or a keying system may be used to provide the distinctive signals instead of tone modulations. The output from these two modulators is applied to the diametrically opposite points 4 and 5 of a transmission line bridge network 6, provided with a transposition 7 in one arm thereof. At point 8 of bridge 6 is coupled upper antenna 9. Because of the transposition 7, the carrier frequency energy from modulators 2 and 3 is substantially balanced out at point 8 and only the side band energy is supplied to antenna 9. Coupled to point 10 on bridge 6 is an antenna 11. As will be seen, the carrier and side band energy from both modulators 2 and 3 will add in phase at point 10 to supply antenna 11. As a consequence, antenna 11 will radiate both carrier and side band frequencies. Since the carrier frequency components of the energy from 2 and 3 add and the side band components do not add, the resultant modulation of the carrier will be in the order of 50% or less. Reflectors 12 and 13 may be associated with antennas 9 and 11, respectively, to give to the radiation patterns different directive characteristics.

The energy from the upper antenna 9 will produce in the vertical plane a multi-lobe radiation pattern illustrated by the pair of lobes 14, 15 of a pattern U, Fig. 2. Height $2h$ of antenna 9 is preferably so chosen that the null between lobes 14, 15 of a pattern U will be substantially aligned with the desired angle of landing of the aircraft. Lower antenna 11 is mounted at a height $h$ above the surface of the earth and produces a multi-lobe radiation pattern L of Fig. 2 having an effective lobe 16. Only one lobe is illustrated to make the illustration clearer. This lobe 16 has its maximum substantially aligned with the minimum between the lobes 14, 15 of pattern U.

Because of the phase reversal at transposition 7, the side band energy supplied to antennas 9 and 11 will have different phase relationships. In the upper lobe 15 of pattern U, for example, the side band energy from lobe 16 will add and subtract respectively at 150 and 90 cycles. The lower lobe 14 of pattern U is phase reversed with respect to that of the upper lobe. Consequently, the side band energy of 90 cycles will add to the lower lobe of pattern U, while the 150 cycle will subtract therefrom. The interaction will produce resultant intersecting patterns of 90 and 150 cycle radiations. A craft will, in following a path defined by this beacon, be guided by equality of signals to a landing. This type of radio beacon is illustrated substantially in the copending application of Andrew Alford, Serial No. 442,069, filed May 7, 1942.

Associated with the transmitter circuit of Fig. 1 is a receiver circuit provided with a receiving antenna 17, a receiver 18 which may be provided with automatic volume control and an indicator 19. The receiver contains known forms of circuits for separating the two beacon signals, and applying them to indicator 19 for comparison. Thus, the energy received from the two antennas 9, 11 will be detected and applied to meter 19 to indicate the position of the craft relative to the glide path course by comparison of the received signals.

The glide path beacon course is preferably made as sharp as possible in order that a considerable distance from the landing runway the indicator may have sufficient sensitivity to keep the craft quite closely aligned with the desired landing path. However, as the craft approaches the runway, this sharp beam narrows down substantially to a point, as indicated by the lines 20, 21 of Fig. 3. Thus, as an aircraft approaches the landing field, the effective sensitivity of the receiver becomes very high so that a small departure, of a few feet above or below, from the gliding path produces a very high difference in the indication. As a consequence, the pilot tends to over-correct for departures from course as he nears the point of contact with the landing runway. This may result in bumpy landings and generally may lessen the confidence of the pilot in the guiding system.

In accordance with my invention, I provide a system for effectively softening the glide path beam at the points near the landing runway so that the pattern defined by solid lines 20, 21 will be effectively spread to follow somewhat the dotted line indications of 22, 23 of Fig. 3. The principles upon which these effects are provided can be understood more clearly from the description of the operation thereof, as given in connection with Figs. 4 and 5.

In Fig. 4 is shown the effect of a relative change in amplitude of energy radiated from the upper and lower antennas. In this figure the relative amplitude of the signals is plotted as ordinates against the vertical angle of the radiation as abscissa. The radiation from the lower antenna is represented by broken line curve 24, pattern L of Fig. 2, while that from the upper antenna U is shown at 25. These two energies have equal relative amplitudes and produce the combining overlapping patterns indicated at 26, 27. In a particular example, as shown, on departure from course a drop of 7.6 decibels per half degree is noted. If the energy from the upper antennas is maintained at the same level 25 and that of the lower antenna is increased to twice the strength, as indicated by curve 28, the resultant 90 and 150 cycle overlapping patterns take the form shown at 29, 30. With this relationship of energies, the sharpness of the course has dropped to 5.4 decibels per one-half degree departure. If the relative signal strength is still further varied so that, for example, the lower radiation has a maximum amplitude three times that of the maximum of upper pattern 25, then the sharpness decreases to 2.26 decibels per one-half degree departure.

This relationship for the two signals may be calculated from the following equations:

$$E90 = K \sin 78.7 + \sin 157.4$$
$$E150 = K \sin 78.7 - \sin 157.4$$

where E90 and E150 represent the signal factors for the 90 and 150 cycle energies, respectively, and K is the ratio of signal strength from the upper and lower antennas. The sharpness per one-half degree departure from course then equals 20 log E90/E150. It can, therefore, be seen that by varying the ratio of signal strength in the two antennas, the sharpness of the course may be varied. This characteristic may be taken advantage of so that the airplane, as it approaches the point of contact, will receive signal energy at different K ratios, by properly adjusting the horizontal patterns of two antennas. Such a modified system may be constructed, as shown in Fig. 5.

Turning to Fig. 5, a landing runway is indicated at 31 and an airplane approaching this landing runway is shown at 32. The glide path beacon is arranged at some point O spaced to one side of runway 31. For convenience of illustration, the directive patterns from the upper and lower antennas of the glide path beacon are shown in the form of circles. It should, however, be understood that these patterns may be in any desired shape, dependent only upon the radiators used for producing the same. Similarly, the pattern U from the upper antenna and the pattern L from the lower antenna may be different in shape from one another, if so desired.

As illustrated, pattern L, which corresponds to the pattern of the same character shown in Fig. 2, represents the radiation from the lower antenna and carries with it the side band radiations as well as the carrier frequency. The pattern U represents that from the upper antenna and consists only of side band components, one of which is phase reversed with respect to the similar modulations applied to the lower antenna. It will be noted, upon reference to Fig. 1, that all the carrier frequency is applied to antenna 11 while side band energy is applied to both of the units. Accordingly, the pattern L does not truly represent the carrier frequency amplitude since this carrier frequency energy amplitude will be substantially twice that of the sidebands in the lower antenna. When any craft, such as 32 is a long distance from the point of center of radiation O, the angle from the craft to this radiation center is substantially zero. Thus, at a distant point, energy from the two patterns U and L will be received at substantially equal amplitudes, as indicated by line OC. Thus, at great distances the effect of the directional offset of the two radiation patterns will not effect the indicator upon departure of the craft from the true course.

It will likewise be clear that, as long as the craft stays directly on the glide path, only energy from pattern L will be substantially effective and the signals will accordingly be received with substantially the same effective modulation depth and the same relative signal amplitudes, regardless of the angular displacement of directive radiation patterns between the two patterns. However, upon departure from course, the variation in signal pattern distribution between the upper and lower antennas comes into account. Thus, as the craft approaches to a point B, the energy from pattern L may be represented by the length OE and the energy from U by the length OD. Thus, the effective ratio of upper and lower radiation patterns upon departure from course becomes greater as represented by the ratio of OD to OE.

As the craft continues in toward the landing strip to a point A, the effective ratio changes to a value determined by the ratio of OF to OG. This value keeps changing as the craft approaches until, at the point of contact PC, the ratio of OM to ON is reached, representing a large variation and a consequent reduction in course sharpness.

By use of the present system, the ratio between the signals received from the lower and upper antennas is effectively increased. As a result, the course sharpness is reduced proportionately in the receiver. By suitably shaping patterns L and U and adjusting the directive patterns thereof, any desired relationship between the change of pattern amplitudes may be achieved.

It is, therefore, clear that with the system as outlined in my invention, the effective path, defined by the signals received on the craft, may be broadened out near the point of contact to avoid troubles otherwise caused by the sharply defined radiation pattern.

While I have described a particular embodiment of my invention to illustrate the application thereof, it should be distinctly understood that this description is made merely by way of illustration. Many changes in the details and constructional arrangements of the apparatus in accordance with the principles of my invention will readily occur to those skilled in the art. Accordingly, this illustration should not be construed as a limitation on my invention, as set forth in the objects of my invention and in the accompanying claims.

What is claimed is:

1. In a radio glide path beacon of the equi-signal type for guiding a craft to a landing point on a landing runway in which a glide path is defined by the intersection of a first and a second radiation pattern carrying differently characterized signal energy, and in which the glide path radiators are displaced with respect to a landing runway, a system for producing a reduction of sharpness of course indications in a receiver indicator, comprising means for providing carrier and signal side band energy defining said first radiation pattern, means for providing signal side band energy only, defining said second radiation pattern, and means for establishing the horizontal distribution of said patterns with respect to one another to provide an increased energy level in said first pattern with respect to said second pattern in the vicinity of said landing runway adjacent to the landing point.

2. In a radio glide path beacon of the equi-signal type in which a glide path is defined by the intersection of first and second radiation patterns each characterized by different indications, and in which the glide path radiators are displaced with respect to a landing runway, a method of providing a reduction of sharpness of course indications produced in a receiver indicator, comprising the steps of providing carrier and signal side band energy defining said first pattern providing signal sideband energy, only defining said second pattern, and establishing the horizontal distribution of said patterns with respect to one another to provide an increased energy level in said first pattern with respect to said second pattern in the vicinity of said landing runway.

3. A radio beacon for guiding aircraft to a landing, comprising a first directive radiating means for producing a radiation pattern having a given directive distribution in a horizontal plane with respect to a landing path, a second radiating means for producing a second radiation pattern having a different directive distribution in a horizontal plane with respect to said landing path, means for applying signal side band and carrier frequency energy to one of said radiating means, and means for applying signal sidebands only to the other of said radiating means, said first radiation means being directed to provide a radiation pattern of substantially greater energy level across said landing path in the area adjacent the landing point, than that provided by said second antenna.

4. In a radio glide path beacon for guiding a craft to a land point on a landing runway, a first radiator spaced laterally with respect to said runway and above the earth at a height sufficient to produce a multi-lobe radiation pattern having a null between two of its lobes aligned substantially with the desired glide path angle, a second radiator substantially at said spaced point and arranged at a different height above the earth to produce a radiation pattern having a maximum substantially aligned with the null of said radiation pattern, and means for characterizing the first of said patterns with signal side bands only and the second of said patterns with signal side bands and carrier frequency to produce on an aircraft a guiding indication, said radiation patterns being directive with the second of said radiation patterns being aligned to provide higher relative radiation toward said landing runway than is provided by the other radiation pattern, whereby the level of energy from said patterns will be received at different relative amplitudes on a craft approaching said runway along said glide path.

5. A system according to claim 4, further comprising means on said craft for receiving energy from said first and second radiation patterns and means for controlling the output level of said receiver means inversely in accordance with the energy level of the energy received from said second named radiation pattern.

6. In a radio glide path beacon arrangement of the equi-signal type for guiding a craft to a landing point on a landing runway, wherein the glide path is defined by the intersection of first and second radiation patterns, one of which carries side band radiation energy only and the other of which carries said signal side band energy and carrier frequency energy, the method of softening the sharpness of said glide path in the area adjacent the point of contact of a craft following the glide path to a landing, which comprises giving directional characteristics to both of said radiation patterns and aligning said second radiation pattern to provide relatively higher radiation amplitudes on said craft as the craft approaches said point of contact.

LEON HIMMEL.

REFERENCES CITED

The following references are of record in the file of this patent:

UNITED STATES PATENTS

| Number | Name | Date |
| --- | --- | --- |
| 2,294,882 | Alford | Sept. 8, 1942 |